United States Patent [19]
Buma

[11] Patent Number: 4,673,171
[45] Date of Patent: Jun. 16, 1987

[54] AIR SUSPENSION

[75] Inventor: Shuuichi Buma, Aichi, Japan

[73] Assignee: Toyota Jidosha Kabushiki Kaisha, Aichi, Japan

[21] Appl. No.: 681,940

[22] Filed: Dec. 14, 1984

[30] Foreign Application Priority Data

Dec. 24, 1983 [JP] Japan .................... 58-197910[U]

[51] Int. Cl.$^4$ .................... B60G 13/00; F16F 9/00
[52] U.S. Cl. .................... 267/8 R; 188/299; 267/64.22; 267/64.24
[58] Field of Search ............ 188/278, 319, 299, 285; 267/8 R, 35, 64.15, 64.22, 64.23, 64.21, 64.24, 64.25, 64.27, 64.28; 280/707, 711, 708, 668

[56] References Cited

U.S. PATENT DOCUMENTS

| 3,046,000 | 7/1962 | Polhemus et al. | 267/64.24 |
|---|---|---|---|
| 3,218,055 | 11/1965 | Nallinger | 267/64.16 |
| 4,313,529 | 2/1982 | Kato et al. | 188/319 |
| 4,364,582 | 12/1982 | Takahashi et al. | 267/64.23 |
| 4,468,739 | 8/1984 | Woods et al. | 280/707 |
| 4,534,580 | 8/1985 | Kobayashi et al. | 267/64.25 |
| 4,592,540 | 6/1986 | Yokoya et al. | 188/299 |

FOREIGN PATENT DOCUMENTS

| 0047048 | 3/1982 | Japan | 188/319 |
|---|---|---|---|
| 0205208 | 12/1982 | Japan | 267/64.28 |

Primary Examiner—John W. Caldwell, Sr.
Assistant Examiner—Alvin Oberley
Attorney, Agent, or Firm—Kane, Dalsimer, Kane, Sullivan and Kurucz

[57] ABSTRACT

An air suspension comprises a shock absorber having a piston rod in which a control rod for adjusting damping force is disposed, an air spring having a main air chamber and an auxiliary air chamber, a valve body for affording and shutting off communication between both air chambers to adjust the spring constant of the air spring, a support connected to a car body and including a rigid member with which the piston rod is coupled and in which the valve body is disposed and a bushing disposed diametrically outward of the rigid member and having a hole opened to the auxiliary air chamber and an actuator fixed to the piston rod above the support to operate the control rod and valve body. The actuator is provided with an electric motor, a gear fixed to the motor and a pair of rods arranged parallel to each other and extending toward the rigid member of the support, one of the rods being connected to the control rod and the other rod being connected to the valve body respectively. Each rod is coupled through a pin with a tube supported rotatably by a bracket. Gears are fixed to the respective tubes to mesh with the gears.

6 Claims, 2 Drawing Figures

U.S. Patent   Jun. 16, 1987   4,673,171
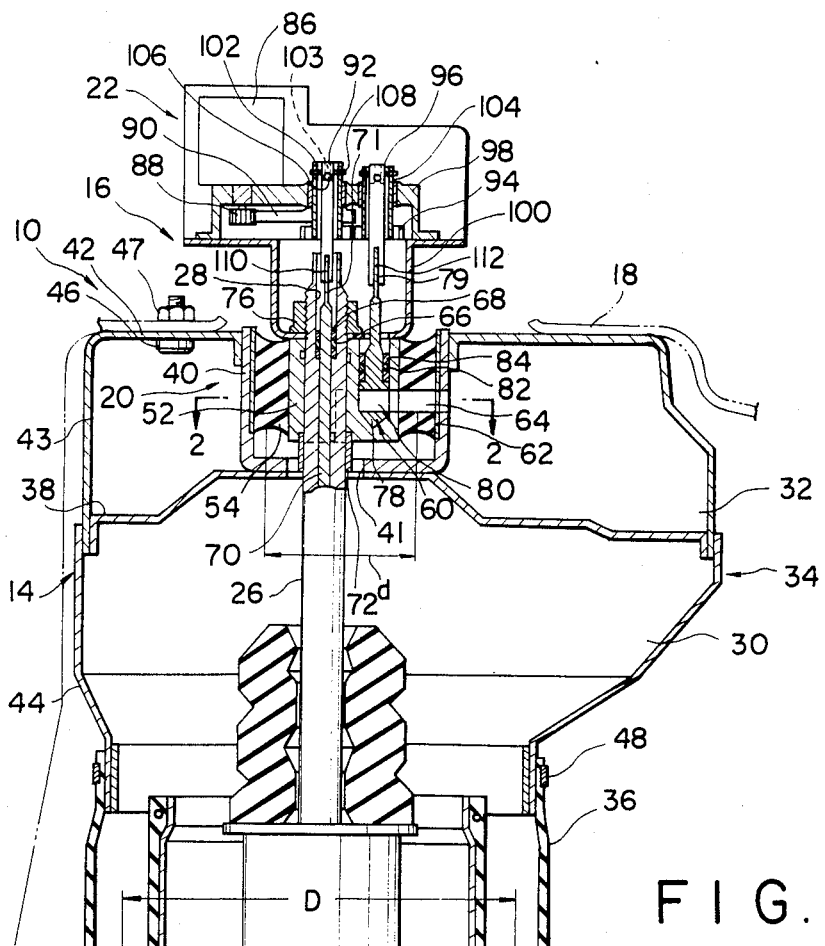
FIG. I
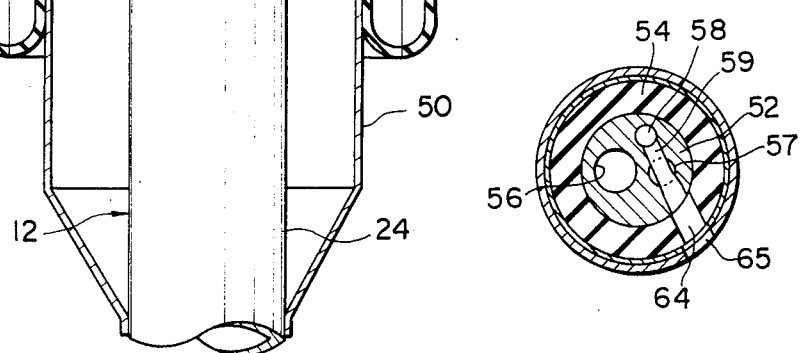
FIG. 2

AIR SUSPENSION

BACKGROUND OF THE INVENTION

1. Field of the Invention

This invention relates to an air suspension, and more particularly to a Macpherson strut type air suspension used for an automobile and having a novel mechanism for adjusting a damping capacity.

2. Description of the Prior Art

For a strut type air suspension is there one capable of adjusting the damping capacity thereof, that is, the damping force of a shock absorber and the spring constant of air spring. In this type suspension, the shock absorber is provided with a damping force adjusting mechanism related to a piston disposed slidably in a cylinder and constituted such that the kinetic energy of liquid flowing through the piston can be varied. On the other hand, the air spring is constituted such that a main air chamber formed by surrounding the shock absorber with a housing and a diaphragm and an auxiliary air chamber are filled with compressed air and a valve body can afford and shut off communication between the main and auxiliary air chambers.

While said type suspension employs a mechanism for adjusting the damping force of the shock absorber and the spring constant of the air spring at the same time, a single control rod is conventionally extended from an actuator into a piston rod of the shock absorber to adjust the damping force of the shock absorber on the one hand and the spring constant of the air spring on the other hand.

SUMMARY OF THE INVENTION

Now, the damping force of the shock absorber can be adjusted by giving a slight rotational angle to the control rod to deviate an orifice provided in the control rod from a hole provided in the piston rod. On the other hand, the large rotational angle has to be given to the control rod for affording and shutting off communication between the main and auxiliary air chambers to vary the spring constant of the air spring. Conventionally, the large rotational angle of the control rod is set to give to the control rod a rotational angle larger than necessary for adjusting originally the damping force of the shock absorber and thereby surplus work to the control rod. This will impose a surplus load to the actuator undesirably from viewpoint of energy saving.

Accordingly, an object of the present invention is to provide an air suspension which can adjust individually the damping force of a shock absorber and the spring constant of an air spring with a single actuator.

The air suspension according to the present invention comprises a shock absorber having a piston rod in which is disposed a control rod for adjusting the damping force, an air spring having a main air chamber and an auxiliary air chamber, a valve body for affording and shutting off communication between both air chambers to adjust the spring constant of the air spring, a support connected to a car body and including a rigid member with which said piston rod is coupled and in which said valve body is disposed and a bushing disposed diametrically outward of the rigid member and having a hole opening to said auxiliary air chamber and an actuator disposed above said support to operate said control rod and valve body.

The other objects and features of the present invention will become apparent from the following description of a preferred embodiment of the invention with reference to the accompanying drawings.

BRIEF DESCRIPTION OF THE DRAWINGS

FIG. 1 is a sectional view showing an essential part of an air suspension according to the present invention having a mechanism for adjusting the damping capacity thereon; and FIG. 2 is a sectional view taken along the line 2—2 of FIG. 1.

DESCRIPTION OF THE PREFERRED EMBODIMENT

A suspension 10, as shown in FIG. 1, comprises a shock absorber 12, an air spring 14 provided to surround the shock absorber 12 and a mechanism 16 for adjusting the damping capacity of the suspension 10, said mechanism 16 being provided with a support 20 for connecting the shock absorber 12 to a car body 18 and an actuator 22.

The shock absorber 12 is provided with a cylinder 24, a piston disposed slidably in the cylinder 24 and a piston rod 26 connected to the piston to project from the cylinder 24 outward. The piston is provided with an orifice and other ports through which oil or other liquid received in the cylinder flows in the extension and contraction of the piston rod 26 and valves for opening and closing the ports. The piston rod is provided with a hole for affording communication between liquid chambers defined above and below the piston. The shock absorber 12 is connected on the lower end to suspension arm. Said constitution itself is known per se and thus not shown in the drawing. Further, for the shock absorber 12 is used a so-called mono tube type one consisting of only a single cylinder in addition to a so-called with tube type one provided with the inside and outside cylinders. The piston rod 26 has a longitudinal hole 28 opened axially from the upper end face.

The air spring 14 is constituted from a main air chamber 30 and an auxiliary air chamber 32 filled with compressed air. The main air chamber 30 is formed by a housing 34 in cooperation with a diaphragm 36 and on the other hand the auxiliary air chamber 32 is formed cooperatively by the housing 34 and a partition plate 38.

The housing 34 has an annular ceiling portion 42 welded over the whole periphery of the inner peripheral edge to a support member 40 of the support 20, a first tubular portion 43 extending integrally from the ceiling portion and a second tubular portion 44. In the embodiment shown in the drawing, a plural of bolts 46 only one is shown are fixed on the ceiling portion 42 of the housing 34 in the airtight condition by welding. Each bolt extends through the car body 18 and a nut 47 is screwed onto the bolt 46 to connect the housing 34 to the car body. The outer peripheral edge of the partition plate 38 is welded to the first tubular portion 43 of the housing 34, and the inner peripheral edge of the partition plate 38 is welded to the support member 40. The second tubular portion 44 of the housing 34 is fitted in the first tubular portion 43 and welded thereto over the whole periphery.

The diaphragm 36 is formed cylindrically of rubber and folded back at the approximately central portion so that the outer end is sandwiched between the second tubular portion 44 of the housing 34 and a ring 48 and fixed to the housing 34 by caulking the ring 48. The inner end of the diaphragm 36 is fitted in a cylindrical air piston 50 welded to the cylinder 24.

The support 20 is provided with a rigid member 52, a bushing 54 formed of rubber and said support member 40. The rigid member 52 is formed of high rigidity material like iron having a circular section and, as shown in FIG. 2, provided with a hole 56 through which the piston rod 26 extends, a hole 57 provided parallel to the hole 56 from the upper end face to the intermediate portion to receive a valve body 60, a hole 58 provided parallel to the hole 57 from the lower end face to the intermediate portion and a hole 59 extending laterally to the outer peripheral surface through the holes 57,58.

The bushing 54 is vulcanized and bonded on the inner peripheral edge to the rigid member 52 and on the outer peripheral edge to a tube 62 so that the tube 62 is press fitted in the support member 40 in the airtight condition. This bushing 54 has a hole 64 communicating to the hole 59 in the rigid member 52 and opening to the auxiliary air chamber 32. The main air chamber 30 communicates to the auxiliary air chamber 32 through the hole 41 in the support member 40, the holes 58,59 in the rigid member 52, the hole 64 in the bushing 54 and holes 65 provided in the tube 62 and the support member 40 to be opposed to the hole 64.

In the embodiment shown in the drawing, the support 20 is connected to the car body 18 through the housing 34. In this case, when the effective diameter d of the support 20 is made smaller than that D of the diaphragm 36, $\pi P(D^2 - d^2)/4$ of forces based upon the internal pressure P acting on the air spring is transmitted from the housing 34 directly to the car body 18 so that the spring constant of the bushing 54 of the support 20 can be lessened to provide a better ride.

A pair of collars 68 between which is interposed a sealing O-ring 66 are press fitted in the longitudinal hole 28 in the piston rod 26, and a control rod 70 is disposed rotatably in the longitudinal hole 28 under the airtight condition provided by the O-ring 66. The control rod 70 has an orifice (not shown) extending diametrically at the lower end and capable of being opposed to the hole for affording communication between the liquid chambers defined above and below the piston. The upper end of the control rod 70 is formed as a flat portion 71.

A ring 72 is welded to the piston rod 26. A sealing O-ring is attached to the hole 56 in the rigid member 52 and the piston rod 26 extends through the hole 56 to make the ring 72 abut against the rigid member 52. A nut 76 is screwed onto the piston rod 26 so that the piston rod 26 is coupled with the rigid member 52 and made airtight by the O-ring.

The valve body 60 has integrally a sliding portion 78 and a flat portion 79 extending upward through a reduced diameter portion, the sliding portion 78 being provided with a hole 80 extending diametrically. The hole 80 can communicate to the hole 59 in the rigid member 52. The valve body 60 is inserted into the hole 57 and a pair of collars 84 between which is interposed a sealing O-ring 82 are press fitted in the hole 57 and made airtight by the O-ring 82 so that the valve body 60 is disposed rotatably in the hole 57. When this valve body 60 is rotated 90° for example, the main air chamber 30 is shut off from the auxiliary air chamber 32.

The actuator 22 is provided with a rotary means 86, a first gear 88, a stepped second gear 90, a first rod 92, a third gear 94 and a second rod 96. In an embodiment shown in the drawing, while the rotary means is an electric motor, a hydraulic motor, a combination of a rack and a pinion moved by a hydraulic cylinder or the like, may be otherwise employed. The rotary means 86 is fixed to a base 98 which is in turn fixed to a bracket 100 coupled with the rigid member 52 by the nut 76.

The base 98 has two holes provided parallel to each other in positions opposed to two holes 56,57 in the rigid member 52, a tube 102 being inserted in one hole rotatably and a tube 104 in the other hole rotatably. The second gear 90 is fixed to the lower end of the tube 102 and the tube 102 is provided on the upper end with a pair of notches 103 spaced circumferentially from each other by 180°. A pin 106 press fitted into the first rod 92 is disposed in the notch 103 and an E-ring 108 is mounted on the tube 102 to prevent the first rod 92 from being pulled out upward. Also, a pin 108 of the first rod 92 contacts the end face of the base 98 to prevent the tube 102 from moving downward.

A tube 104 having the lower end fixed to the third gear 94 and the second rod 96 are interconnected in the same constitution as said tube 102 and the first rod 92. As a result, the first and second rods 92,96 are arranged parallel to each other to extend toward the rigid member 52, and the lower gear of the second gear 90 meshes with the third gear 94. The upper gear of the second gear 90 meshes with the first gear 88 directly connected to the rod of the rotary means 86. Instead of said arrangement, the first, second and third gears may be arranged to mesh with each other. By selecting the proper number of teeth of each gear can be selected any rotational angles of the first and second rods 92,96.

The first and second rods 92,96 have respectively slits 110,112. The first portion 71 of the control rod 70 and the flat portion 79 of the valve body 60 are respectively inserted into a slit 110 of the first rod and a slit 112 of the second rod.

OPERATION OF THE EMBODIMENT

When an automobile is travelling, the rotary means 86 of the actuator 22 is operated to rotate the control rod 70 through the gears 88,90, tube 102 and first rod 92 for adjusting the damping force of the shock absorber on one hand, and on the other hand rotate the valve body 60 through the gears 90,94, tube 104 and second rod 96 for affording or shutting off communication between the main air chamber 30 and the auxiliary air chamber 32 to adjust the spring constant of the air spring. In this case, the adjustment is generally carried out such that the spring constant of the air spring is hardened when the damping force of the shock absorber becomes large and softened when same becomes small. However, further adjustments may be necessarily possible according to the types of vehicles.

When the automobile is travelling, and tires bound and rebound, the shock absorber 12 swings to deform the bushing 54 of the support 20. Two rods 92,96 of the actuator 22 are located opposed to the rigid member of the support 20, so that the relative positional relationship between both rods is not varied and the adjusting mechanism is not affected by any troubles.

According to the present invention are obtained the following effects:

Not only the damping force of the shock absorber and the spring constant of the air spring can be adjusted by the same actuator, but also the control rod for adjusting the damping force of the shock absorber and the valve body for adjusting the spring constant of the air spring can be individually operated, so that the respective optimum operational ranges can be set.

The large rotational angle for adjusting the damping force of the shock absorber does not need to be given to the control rod, so that a surplus work for the control rod can be dispensed with to reduce a load on the actuator.

Also, since the bushing of the support is provided with a hole for affording communication between the main and auxiliary air chambers, the hole can follow up the vertical and pinching movements of the bushing.

What is claimed is:

1. An air suspension comprising:
a shock absorber having a piston rod in which a control rod for adjusting damping force is disposed;
an air spring having a main air chamber and an auxiliary air chamber;
a valve body for affording and shutting off communication between both air chambers to adjust the spring constant of the air spring;
a support connected to a car body and including a rigid member with which said piston rod is coupled and in which said valve body is disposed and a bushing disposed diametrically outward of the rigid member and having a hole for an air passage between the air chambers which is controlled by said valve body; and
an actuator disposed above said support to operate said control rod and valve body, said actuator comprising a rotary means, a pair of rods disposed parallel to each other and extended toward said rigid member of said support, one being connected to said control rod and the other being connected to said valve body respectively and a means for transmitting the turning force of said rotary means to said pair of rods.

2. An air suspension as claimed in claim 1, wherein said main air chamber is formed of a housing and a diaphragm and said support is connected to said car body through said housing, the effective diameter of said support being smaller than that of said diaphragm.

3. An air suspension as claimed in claim 1, wherein said transmitting means includes a gear fixed to said rotary means and a pair of gears engaging respectively to said pair of rods, at least one of gears meshing with said gear.

4. An air suspension as claimed in claim 3, wherein each of said rods is coupled through a pin with a tube supported rotatably by a bracket and each of said gears is fixed to said tube.

5. An air suspension comprising:
a shock absorber having a piston rod in which a control rod for adjusting damping force is disposed;
an air spring having a main air chamber and an auxiliary air chamber;
a valve body for affording and shutting off communication between both air chambers to adjust the spring constant of the air spring;
a support connected to a car body and including a rigid member with which said piston rod is coupled and in which said valve body is disposed and a busing disposed diametrically outward of the rigid member and having a hole for an air passage between the air chambers which is controlled by said valve body; and
an actuator fixed to said piston rod above said support to operate said control rod and valve body, said actuator being provided with a rotary means, a gear fixed to said rotary means and a pair of two rods arranged parallel to each other and extended toward said rigid member of said support, one rod being connected to said control rod and the other rod being connected to said valve body respectively, each of said rods being coupled through a pin with a tube supported rotatably by a bracket and a pair of gears respectively fixed to said pair of tubes, at least one of the gears meshing with said gear.

6. An air suspension comprising:
a shock absorber having a piston rod in which a control rod for adjusting damping force is disposed;
an air spring having a main air chamber and an auxiliary air chamber and formed by a diaphragm and a housing which is connected to a car body and the diaphragm respectively;
a valve body for affording and shutting off communication between both said air chambers to adjust the spring constant of the air spring;
a support including a rigid member to which said piston rod is connected and in which said valve body is disposed and a rubber bushing disposed diametrically outward of the rigid member and having a hole for an air passage between the air chambers which is controlled by said valve body, the bushing being connected to the housing and thereby to the car body; and
an actuator disposed above said support to operate said control rod and said valve body, said actuator comprising a rotary means, a pair of rods disposed parallel to each other and extended toward said rigid member of said support, one being connected to said control rod and the other being connected to said valve body respectively and a means for transmitting the turning force of said rotary means to said pair of rods.

* * * * *